(12) United States Patent
Sareen et al.

(10) Patent No.: US 12,627,555 B2
(45) Date of Patent: May 12, 2026

(54) DEVICE LOCKDOWN REMEDIATION IN ENTERPRISE LABS

(71) Applicant: Lenovo Enterprise Solutions (Singapore) Pte. Ltd., New Tech Park (SG)

(72) Inventors: Shyam Sareen, Cary, NC (US); Rod D. Waltermann, Rougemont, NC (US)

(73) Assignee: Lenovo Enterprise Solutions (Singapore) Pte. Ltd., New Tech Park (SG)

( * ) Notice: Subject to any disclaimer, the term of this patent is extended or adjusted under 35 U.S.C. 154(b) by 80 days.

(21) Appl. No.: 18/514,296

(22) Filed: Nov. 20, 2023

(65) Prior Publication Data

US 2025/0168057 A1 May 22, 2025

(51) Int. Cl.
| | |
|---|---|
| *H04L 41/0663* | (2022.01) |
| *H04L 41/0686* | (2022.01) |
| *H04L 41/16* | (2022.01) |
| *H04L 43/0811* | (2022.01) |

(52) U.S. Cl.
CPC ...... *H04L 41/0663* (2013.01); *H04L 41/0686* (2013.01); *H04L 41/16* (2013.01); *H04L 43/0811* (2013.01)

(58) Field of Classification Search
None
See application file for complete search history.

(56) References Cited

U.S. PATENT DOCUMENTS

| | | | |
|---|---|---|---|
| 2014/0129613 A1* | 5/2014 | Van Depoel | .......... H04L 67/125 |
| | | | 709/202 |
| 2015/0178701 A1* | 6/2015 | Glass | ................. G06Q 30/0226 |
| | | | 705/14.27 |
| 2023/0231763 A1* | 7/2023 | Nedungadi | ......... H04L 41/0668 |
| | | | 714/4.11 |

(Continued)

OTHER PUBLICATIONS

BMC, "AIOps: Artificial Intelligence for IT Operations", BMC AMI Ops, date known about and downloaded on Sep. 19, 2023, pp. 1-10.

(Continued)

*Primary Examiner* — Mohamed Ibrahim
(74) *Attorney, Agent, or Firm* — Kunzler Needham & Hilton; Bruce R. Needham

(57) ABSTRACT
A method for providing a backup connection to a computing device for remediation after detecting network connection loss includes determining that a computing device has lost a network connection to an off-site management server. The method includes establishing a backup connection to a local server in response to determining that the computing device has lost connection to the off-site management server. The backup connection is a wired connection or a wireless connection and the local server is located on-site with the computing device. The method includes diagnosing, using a connectivity problem tool executing at least partially on the local server, a problem with connectivity between the computing device and the off-site management server, identifying, using the connectivity problem tool, one or more solutions directed at restoring connectivity between the computing device and the off-site management server, and executing the one or more solutions.

20 Claims, 10 Drawing Sheets

(56) References Cited

U.S. PATENT DOCUMENTS

2025/0106455 A1* 3/2025 Giraud ............. H04N 21/25875
2025/0111616 A1* 4/2025 Wannerberg .......... G06T 19/006

OTHER PUBLICATIONS

Moogsoft, "Moogsoft AIOps supports continuous availability by detecting problems before they become critical", Moogsoft AI Ops, date known about and downloaded on Sep. 19, 2023, pp. 1-8.
Uipath, "Accomplish more-with more intelligent software robots", Uipath Robots, date known and downloaded on about Sep. 19, 2023, pp. 1-11.
Vertiv, "A Scalable, Resilient, Extensible Ecosystem For Your Ever Changing IT Management Needs", Vertiv Avocent DSView Solution, date known about Sep. 19, 2023, pp. 1-5.

* cited by examiner

100

500

600

Begin

Determine Computing Device Has Lost
602 Connection With Off-Site Management
Server Establish Backup Connection With
604 Local Server Diagnose, With Problem Tool on Local
606 Server, Problem With Connectivity Identify, With Problem Tool, One or
608 More Solutions to Connectivity 610 Execute the One or More Solutions End

DEVICE LOCKDOWN REMEDIATION IN ENTERPRISE LABS

FIELD

The subject matter disclosed herein relates to access to computing devices and more particularly relates to providing a backup connection to computing devices for remediation after detecting network connection loss.

BACKGROUND

In environments where a computing device is connected to an off-site management server, loss of connection to the off-site management server typically requires a system administrator go to the computing device to restore connectivity between the computing device and the off-site management server.

BRIEF SUMMARY

A method for providing a backup connection to a computing device for remediation after detecting network connection loss includes determining that a computing device has lost a network connection to an off-site management server. The off-site management server is located at a different location than the computing device. The method includes establishing a backup connection to a local server in response to determining that the computing device has lost connection to the off-site management server, the backup connection comprising one of a wired connection and a short-range wireless connection, the local server located on-site with the computing device. The method includes diagnosing, using a connectivity problem tool executing at least partially on the local server, a problem with connectivity between the computing device and the off-site management server, identifying, using the connectivity problem tool, one or more solutions directed at restoring connectivity between the computing device and the off-site management server, and executing the one or more solutions.

An apparatus for using a backup connection to a computing device for remediation after detecting network connection loss includes a backup connection receiver module configured to receive a backup connection to a local server in response to determining that a computing device has lost connection to an off-site management server. The backup connection includes a wired connection or a wireless connection, the off-site management server located at a different location than the computing device, and the local server is located on-site with the computing device. The apparatus includes a connectivity problem tool executing at least partially on the local server that includes a diagnosis module configured to diagnose a problem with connectivity between the computing device and the off-site management server and a solution module configured to identify one or more solutions directed at restoring connectivity between the computing device and the off-site management server. The apparatus includes a solution execution module configured to execute the one or more solutions. The modules include hardware circuits, a programmable hardware device, and/or executable code. The executable code is stored on computer readable storage media.

A program product for using a backup connection to a computing device for remediation after detecting network connection loss includes a non-transitory computer readable storage medium storing code. The code is configured to be executable by a processor to perform operations that include receiving, using a connectivity problem tool, a backup connection to a local server in response to determining that a computing device has lost connection to an off-site management server. The backup connection includes a wired connection or a wireless connection, the off-site management server located at a different location than the computing device, and the local server is located on-site with the computing device. The operations include diagnosing, using the connectivity problem tool executing at least partially on the local server, a problem with connectivity between the computing device and the off-site management server and identifying, using the connectivity problem tool, one or more solutions directed at restoring connectivity between the computing device and the off-site management server. The operations include executing the one or more solutions.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
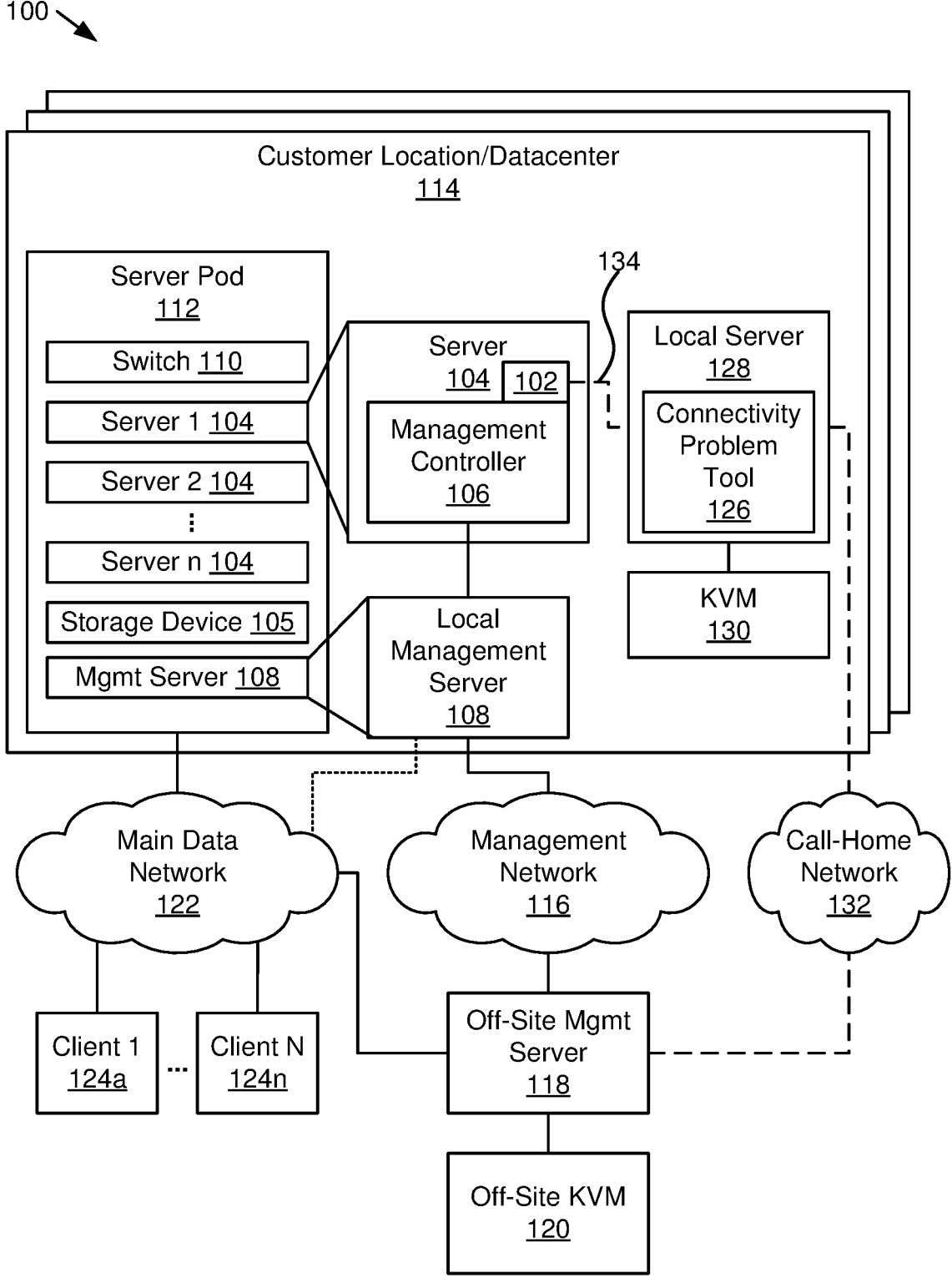
FIG. 1 is a schematic block diagram illustrating a system for providing a backup connection to a computing device for remediation after detecting network connection loss, according to various embodiments.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices, in some embodiments, are tangible, non-transitory, and/or non-transmission.

Many of the functional units described in this specification have been labeled as modules, in order to more particularly emphasize their implementation independence. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

More specific examples (a non-exhaustive list) of the storage device would include the following: an electrical connection having one or more wires, a portable computer diskette, a hard disk, a random access memory ("RAM"), a read-only memory ("ROM"), an crasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, R. Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/ acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C.

A method for providing a backup connection to a computing device for remediation after detecting network connection loss includes determining that a computing device has lost a network connection to an off-site management server. The off-site management server is located at a different location than the computing device. The method includes establishing a backup connection to a local server in response to determining that the computing device has lost connection to the off-site management server, the backup connection comprising one of a wired connection and a short-range wireless connection, the local server located on-site with the computing device. The method includes diagnosing, using a connectivity problem tool executing at least partially on the local server, a problem with connectivity between the computing device and the off-site management server, identifying, using the connectivity problem tool, one or more solutions directed at restoring connectivity between the computing device and the off-site management server, and executing the one or more solutions.

In some embodiments, the connectivity problem tool uses a machine learning algorithm to diagnose the problem with connectivity between the computing device and the off-site management server and to identify the one or more solutions. In other embodiments, the machine learning algorithm uses data from a plurality of computing devices. The data is gathered during a training phase and the data includes conditions related to connectivity between the computing devices and a corresponding off-site management server connected over a network and/or one or more solutions used to resolve the connectivity between the plurality of computing devices and the corresponding off-site management server. In other embodiments, the machine learning algorithm uses data from diagnosing the problem with the connectivity between the computing device and the off-site management server and/or results from executing the one or more solutions in an operational phase to revise the machine learning algorithm.

In some embodiments, the method includes execution, by the computing device, of a preliminary solution to restore loss of connectivity between the computing device and the off-site management server prior to establishing the backup connection where establishing the backup connection is in response to a failure of the execution of the preliminary solution. In other embodiments, in response to a failure of the one or more solutions restoring connectivity between the computing device and the off-site management server, the method includes transmitting an alert to a system administrator over a secondary connection. In other embodiments, the method includes, in response to the transmission of the alert, receiving input from a system administrator to manually restore the connectivity between the computing device and the off-site management server, where a manual repair command in response to the input is received over the backup connection. In other embodiments, the secondary connection includes a network different from the network connection between the computing device and the off-site management server.

In some embodiments, the network connection between the computing device and the off-site management server is between a management controller within the computing device and the off-site management server and/or is over a management network separate from a data network used by the computing device to send and receive data from a client. In other embodiments, determining that the computing device has lost the network connection to the off-site management server includes determining that the computing device has lost a network connection between a management controller within the computing device and the off-site management server over a management network and has lost a connection between the computing device and a client over a data network.

In some embodiments, diagnosing the problem with the connectivity between the computing device and the off-site management server includes determining that the computing device is not security compliant, determining that computing resources of the computing device are used for excessive out-of-band network communications, determining that the computing device is under attack by a computer virus, determining that the network connection is not operational, and/or determining that a hardware device in the computing device is not functioning properly.

An apparatus for using a backup connection to a computing device for remediation after detecting network connection loss includes a backup connection receiver module configured to receive a backup connection to a local server in response to determining that a computing device has lost connection to an off-site management server. The backup connection includes a wired connection or a wireless connection, the off-site management server located at a different location than the computing device, and the local server is located on-site with the computing device. The apparatus includes a connectivity problem tool executing at least partially on the local server that includes a diagnosis module configured to diagnose a problem with connectivity between the computing device and the off-site management server and a solution module configured to identify one or more solutions directed at restoring connectivity between the computing device and the off-site management server. The apparatus includes a solution execution module configured to execute the one or more solutions. The modules include hardware circuits, a programmable hardware device, and/or executable code. The executable code is stored on computer readable storage media.

In some embodiments, the connectivity problem tool uses a machine learning algorithm to diagnose the problem with connectivity between the computing device and the off-site management server and to identify the one or more solutions. In other embodiments, the machine learning algorithm uses data from a plurality of computing devices where the data is gathered during a training phase and the data includes conditions related to connectivity between the computing devices and a corresponding off-site management server connected over a network and/or one or more solutions used to resolve the connectivity between the plurality of computing devices and the corresponding off-site management server. In other embodiments, the machine learning algorithm uses data from diagnosing the problem with the connectivity between the computing device and the off-site management server and/or results from executing the one or more solutions in an operational phase to revise the machine learning algorithm.

In some embodiments, the computing device comprises a monitoring apparatus includes a connection module configured to determine that the computing device has lost the network connection to the off-site management server, a backup connection module configured to establishing the backup connection to the local server in response to determining that the computing device has lost connection to the off-site management server, and/or a preliminary solution module configured to execute, on the computing device, a preliminary solution to restore loss of connectivity between the computing device and the off-site management server prior to establishing the backup connection where establishing the backup connection is in response to a failure of the execution of the preliminary solution. In other embodiments, the apparatus includes an alert module configured to, in response to a failure of the one or more solutions restoring connectivity between the computing device and the off-site management server, transmit an alert to a system administrator over a secondary connection. In other embodiments, the apparatus includes a manual repair module configured to, in response to the transmission of the alert, receive input from a system administrator to manually restore the connectivity between the computing device and the off-site management server where a manual repair command in response to the input is received over the backup connection. In other embodiments, the network connection between the computing device and the off-site management server is between a management controller within the computing device and the off-site management server and/or is over a management network separate from a data network used by the computing device to send and receive data from a client.

A program product for using a backup connection to a computing device for remediation after detecting network connection loss includes a non-transitory computer readable storage medium storing code. The code is configured to be executable by a processor to perform operations that include receiving, using a connectivity problem tool, a backup connection to a local server in response to determining that a computing device has lost connection to an off-site management server. The backup connection includes a wired connection or a wireless connection, the off-site management server located at a different location than the computing device, and the local server is located on-site with the computing device. The operations include diagnosing, using the connectivity problem tool executing at least partially on the local server, a problem with connectivity between the computing device and the off-site management server and identifying, using the connectivity problem tool, one or more solutions directed at restoring connectivity between the computing device and the off-site management server. The operations include executing the one or more solutions.

In some embodiments, the connectivity problem tool uses a machine learning algorithm to diagnose the problem with connectivity between the computing device and the off-site management server and to identify the one or more solutions and the machine learning algorithm uses data from a plurality of computing devices. The data is gathered during a training phase and the data includes conditions related to connectivity between the computing devices and a corresponding off-site management server connected over a network and/or one or more solutions used to resolve the connectivity between the plurality of computing devices and the corresponding off-site management server.

FIG. 1 is a schematic block diagram illustrating a system 100 for providing a backup connection to a computing device for remediation after detecting network connection loss, according to various embodiments. The system 100 includes computing devices in the form of servers 104 (e.g., server 1-*n*), storage devices 105, switches 110, etc. in server pods 112 where the computing devices each include a management controller 106 and a monitoring apparatus 102. FIG. 1 depicts a single server 104 with a management controller 106 and monitoring apparatus 102, but typically other computing devices of the system 100 include a management controller 106 and the monitoring apparatus 102.

Each server pod 112, in some embodiments, includes a local management server 108 that connects to each computing device with a management controller 106. In some embodiments, the system 100 includes a single local management server 108 for a customer location 114, which may be a datacenter. In other embodiments, the customer location 114 includes multiple local management servers 108, such as one for each server pod 112, rack, etc. The local management server 108 is in communication with an off-site management server 118 over a management network 116. The off-site management server 118, in some embodiments, is at a location of an owner of some or all of the computing devices (e.g., servers 104, storage devices 105, switches 110, power supplies, or the like), for instance, when the owner leases the computing devices to the customer. In other embodiments, the off-site management server 118 is for a company that monitors and repairs the computing devices where the computing devices may be owned by the customer or the owner. In other embodiments, a system does not include a local management server 108 and instead computing devices of the system each connect directly with an off-site management server 118.

The management controller 106, in some embodiments, is referred to as a baseboard management controller ("BMC"). In other embodiments, the management controller 106 is an Xclarity® controller ("XCC") by Lenovo®, an Intel® AMT (Active Management Technology), or a controller with similar functionality. In some embodiments, the management controller 106 monitors internal physical variables in the servers 104, storage devices 105, and other computing devices, such as temperature, humidity, power supply voltage, fan speeds, communication parameters, operating system ("OS") functions, and the like and communicates measurements and other data to the local management server 108. Typically, the servers 104 each include a management controller 106. In some embodiments, power supplies, storage devices 105, switches 110, etc. include a management controller 106. In some embodiments, the management controller 106 measures and stores power consumption data, utilization data, operational data and other metering data of the server 104 and other computing devices.

In other examples, the local management server 108, through the management controller 106, deploys instructions, software, firmware, etc. to deploy a virtual machine ("VM") managed by a hypervisor in servers 104. In some embodiments, instructions, software, firmware, etc. from the local management server 108 may allocate server resources to the VM, may initiate an OS instance in the VM, etc. One of skill in the art will recognize other ways that a local management server 108 functions with respect to the servers 104 and other computing devices. In some examples, the local management server 108 is an Xclarity® Administrator ("XCA") that manages several servers 104, storage devices 105, switches 110, etc. and associated management controllers 106.

In some embodiments, the management network 116 is separate from a main data network 122 connecting the servers 104 and other computing devices with clients 124. Typically, the main data network 122 carries much more data than the management network 116 and has a bandwidth capable of handling data traffic between the clients 124 and customer datacenter at the customer location 114. In some embodiments, the management network 116 is secure and includes a firewall capable of limiting external traffic to communication with a system administrator over the off-site management server 118. In other embodiments, the off-site management server 118 communicates with the local management server 108 over the main data network 122 using secure communications, such as over a tunnel, a virtual private network ("VPN"), etc.

In some embodiments, the management network 116 includes local area network ("LAN"), a wide area network ("WAN"), a fiber network, a wireless connection, a cellular network, etc. and may also include a combination of network types. In some embodiments, the main data network 122 is local area network ("LAN"), a wide area network ("WAN"), a fiber network, a wireless connection, a cellular network, the Internet, etc. and may also include a combination of network types. The management network 116 and the main data network 122 include data cables, servers, switches, routers, and/or other networking equipment.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a BLUETOOTH® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® ("ASTM"®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

In some embodiments, the system 100 includes storage devices 105, which may include a management controller 106. The storage devices 105 are typically non-volatile storage devices and may include solid-state storage devices, hard disk drives, optical disks, or other non-volatile storage technology. In some embodiments, the storage devices 105 are accessible by a client 124.

In some embodiments, the system 100 includes one or more switches 110, which control network traffic between clients 124 through the main data network 122 and computing devices at the customer location 114, such as the servers 104, storage devices 105, etc. In some embodiments, the switches 110 include a management controller 106.

In the embodiments described herein, computing devices with a management controller 106 include a monitoring apparatus 102. In other systems, such as smaller systems, the computing devices may not include a management controller 106 and are managed through the main data network 122, but do include a monitoring apparatus 102. In such embodiments, the off-site management server 118 may communicate with firmware of the computing device, such as firmware in a basic input/output system ("BIOS"), a unified extensible firmware interface ("UEFI"), or the like.

The system 100 includes a local server 128 with a connectivity problem tool 126. The local server 128 is connected to the server 104 or other computing device of the system 100 by a backup connection 134 (dashed line) that is different than a network at the customer location 114 connected to the main data network 122 and/or management network 116. In some embodiments, the connectivity problem tool 126 executes on the local server 128. In other embodiments, at least a portion of the connectivity problem tool 126 is located elsewhere, such as a portion of the connectivity problem tool 126 being located on the computing device. The backup connection 134, in some embodiments, operates in dependent of an operating system ("OS") of a server 104 or other computing device with the monitoring apparatus 102. The backup connection 134, in some embodiments, operates through BIOS control, UEFI control, firmware control, etc. and may be management ports typically hidden from the OS and managed by the management controller 106, BIOS, firmware, etc.

In some embodiments, the backup connection 134 is a Universal Serial Bus ("USB") connection, which is hard wired with a USB cable. In other embodiments, the backup connection 134 is a serial connection to the computing device that is also hard wired. In other embodiments, the backup connection 134 is a short-range wireless connection, such as Bluetooth®, ZigBee®, Z-wave®, ANT®, ANT+®, or the like. In other embodiments, the backup connection 134 is a wireless wide area network ("WWAN") connection. One of skill in the art will recognize other suitable backup connection types.

In some embodiments, the local server 128 is connected to the off-site management server 118 or other emergency resource via a call-home network 132. The call-home network 132 is often included with systems 100 as a way to send a notification to a system administrator when other networks, such as the management network 116 and/or main data network 122 are down. The call-home network 132, is often connected via a network technology different from the main data network 122 and/or the management network 116. In some examples, the call-home network 132 includes a cellular network, a dialup telephone connection, or other network available when the main data network 122 and/or management network 116 are down. While the call-home network 132 is depicted as connecting to the local server 128, in other embodiments, the call-home network 132 is connected to one or more other computing devices, such as an on-site system administrator computer.

In some embodiments, the local server 128 is connected to a KVM 130. In other embodiments, the off-site management server 118 is accessed by an off-site KVM 120. A KVM, in some embodiments, is a keyboard, video, mouse ("KVM") switch that enables a system administrator or other user to connect to one or more computing devices using input/output devices, such as a keyboard, a mouse, a track pad, an electronic display, etc. In other embodiments, the local server 128 and/or off-site management server 118 are not connected to a KVM switch, but instead include dedicated input/output devices, such as a keyboard, mouse, and electronic displays that are hard wired to the local server 128 and/or off-site management server 118.

Computing devices of the system 100 include a monitoring apparatus 102 configured to determine that a computing device of the system 100 has lost a network connection to a management server, such as the off-site management server 118, where this management server is located at a different location than the computing device. The monitoring apparatus 102 also establishes a backup connection 134 to a local server 128 using a wired connection, a short-range wireless connection, or the like. The wired connection, in various embodiments, is a USB connection, a serial connection, or the like. The short-range wireless connection may be a Bluetooth® connection, a ZigBee®, connection, a Z-Wave® connection, or the like.

The connectivity problem tool 126 on the local server 128 is then able to diagnose a problem with the connectivity between the computing device and the off-site management server 118 and identify one or more solutions directed at restoring connectivity between the computing device and the off-site management server 118. The local server 128 and/or computing device then executes the one or more solutions to try to restore connectivity between the computing device and the off-site management server 118. Where the solutions fail, in some embodiments, the connectivity problem tool 126 and/or the monitoring apparatus 102 are able to use the call-home network 132 or possibly the main data network 122 to send an alert to a system administrator about the connectivity issue and so that the system administrator is able to use the backup connection 134 to manually restore connectivity between the computing device and the off-site management server 118. The monitoring apparatus 102 and the connectivity problem tool 126 are discussed in more detail below.

Figure 2:
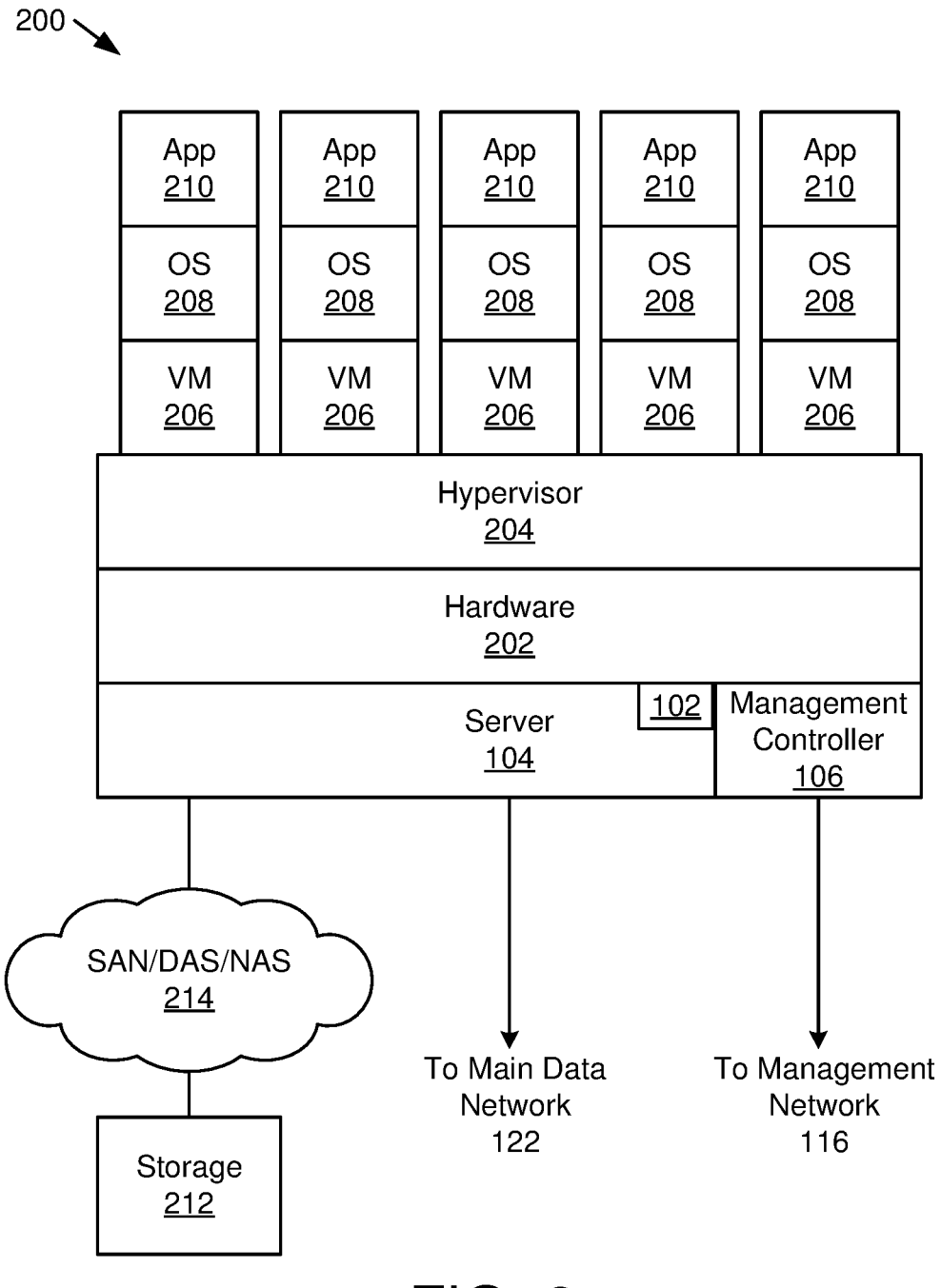
FIG. 2 is a schematic block diagram illustrating a server with a hypervisor and virtual machines, according to various embodiments.

FIG. 2 is a schematic block diagram 200 illustrating a server 104 with a hypervisor 204 and virtual machines 206, according to various embodiments. One or more of the servers 104, in some embodiments, are configured to host virtual machines 206. The server 104 includes at least one monitoring apparatus 102. The servers 104 include hardware 202 with a hypervisor 204 running on the hardware 202. Virtual machines 206 are then deployed on the servers 104 through the hypervisor 204, which manages data traffic between the virtual machines and clients 124 and handles other management tasks of the virtual machines 206. Each virtual machine 206 typically runs a separate instance of an OS 208 and the OS 208 executes one or more applications 210 on the virtual machine 206. In other embodiments, the hypervisor 204 hosts one or more containers that include one or more applications 210.

In some embodiments, the management controller 106 of a server 104 executes a deployment file to deploy a virtual machine 206. In other embodiments, the management controller 106 of the server 104 executes a deployment file to deploy the hypervisor 204 when the server 104 is first set up or for an update. The server 104 is depicted with a Type I hypervisor 204, which runs on bare metal (e.g., hardware 202). The embodiments described herein are also applicable to a Type II hypervisor 204, which runs on an operating system (not shown) running on the hardware 202 of the server 104.

In some embodiments, the server 104 includes a data storage device (not shown), such as a hard disk drive, solid-state storage, etc. Typically, the server 104 also has access to data storage 212 through a storage area network ("SAN") 214, or similar network, such as direct attached storage ("DAS") 214, network attached storage ("NAS") 214, or the like. The server 104 may access clients 124 over the main data network 122 through a switch 110.

In some embodiments, the monitoring apparatus 102 monitors the virtual machines 206, in addition to the hardware 202, hypervisor 204, etc. In the embodiments, the computing device is a virtual machine 206 and the monitoring apparatus 102 determines if a virtual machine 206 has lost connection to the off-site management server 118. In other embodiments, the server 104 includes one or more monitoring apparatuses 102 for each virtual machine 206, which may be deployed when the virtual machine 206 is deployed, and the server 104 may include another monitoring apparatus 102 to monitor the server 104.

Figure 3A:
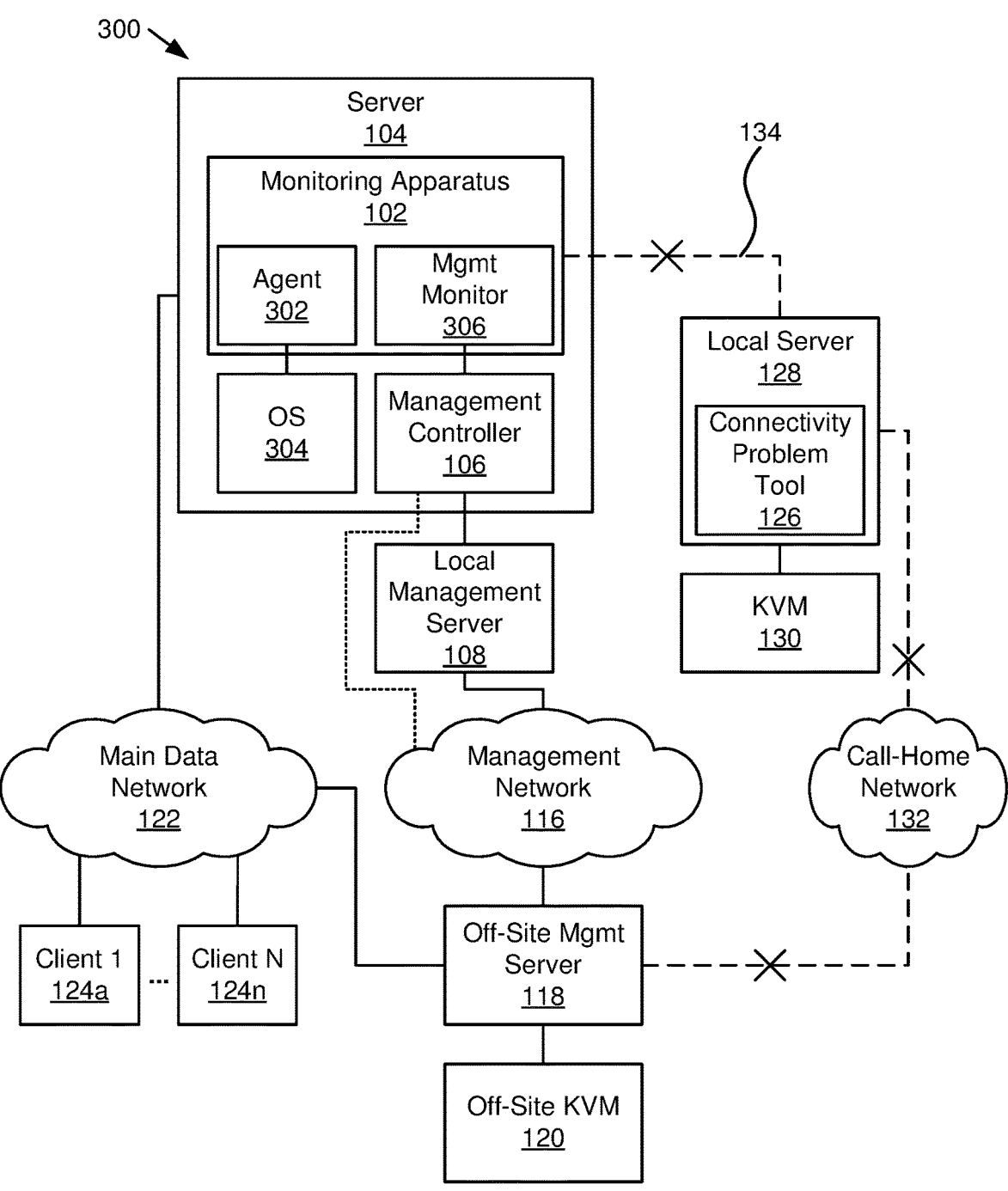
FIG. 3A is a schematic block diagram illustrating a system with a monitoring apparatus during normal operation, according to various embodiments.

FIG. 3A is a schematic block diagram illustrating a system 300 with a monitoring apparatus 102 during normal operation, according to various embodiments. The system 300 of FIG. 3A depicts a computing device in the form of a single server 104. In some embodiments, the server 104 it a server in a server pod 112 of the system 100 of FIG. 1. In other embodiments, the server 104 is part of an edge computing system and may not include a local management server 108, but may instead connect directly to the off-site management server 118 over a management network 116. In other embodiments, the server 104 of FIG. 3A is another computing device, such as a storage device 105, switch, power supply, etc. that includes at least monitoring apparatus 102 and may also include a management controller 106 in the computing device. While FIGS. 1, 2, 3A-C depict a monitoring apparatus 102 in a server 104, the monitoring apparatus 102 may be in any computing device connected to an off-site management server 118.

The server 104 includes a monitoring apparatus 102 with an agent 302 that monitors the operating system ("OS") 304 and a management monitor 306 that manages the management controller 106. Where a computing device does not include a management controller 106, the monitoring apparatus 102 includes the agent 302 but may not include a management monitor 306 or the management monitor 306 is inactive.

FIG. 3A depicts normal operation where the management controller 106 is in communication with an off-site management server 118 either directly (dashed line) or through an local management server 108. In addition, the server 104 is in communication with clients 124 over a main data network 122 and may also be connected over the main data network 122 to the off-site management server 118. The backup connection 134 is depicted with an "X" indicating that the backup connection 134 is not established.

The backup connection 134 not being established, in some embodiments, includes the backup connection 134 being inactive or other similar condition where the monitoring apparatus 102 is not communicating with the local server 128. However, where the backup connection 134 is a wired connection, the cabling connecting the local server 128 to the server 104 is in place so that the monitoring apparatus 102 is able to establish a connection to the local server 128 and/or connectivity problem tool 126 through software and/or firmware without assistance of a user. The call-home network 132 is also depicted with "X"s as being inactive. Typically, the call-home network 132 is not active or in use while the main data network 122 and/or management network 116 are active, but the call-home network 132 may be used as necessary when needed.

During normal operation, the monitoring apparatus 102 monitors connectivity. The management monitor 306 monitors operation of the management controller 106 and associated memory, ports, hardware, etc. to detect a loss of connection between the management controller 106 and the off-site management server 118. The agent 302 monitors the OS 304 and may also monitor ports, devices, memory, hardware, etc. of the server 104 to detect a loss of connection between the server 104 and external devices, such as clients 124 or other devices in communication with the server 104. In some instances, the server 104 is connected to the off-site management server 118 over the main data network 122. In some embodiments, the connection between ports of the server 104 under OS control and the off-site management server 118 serves as a backup connection to the management network 116.

Figure 3B:
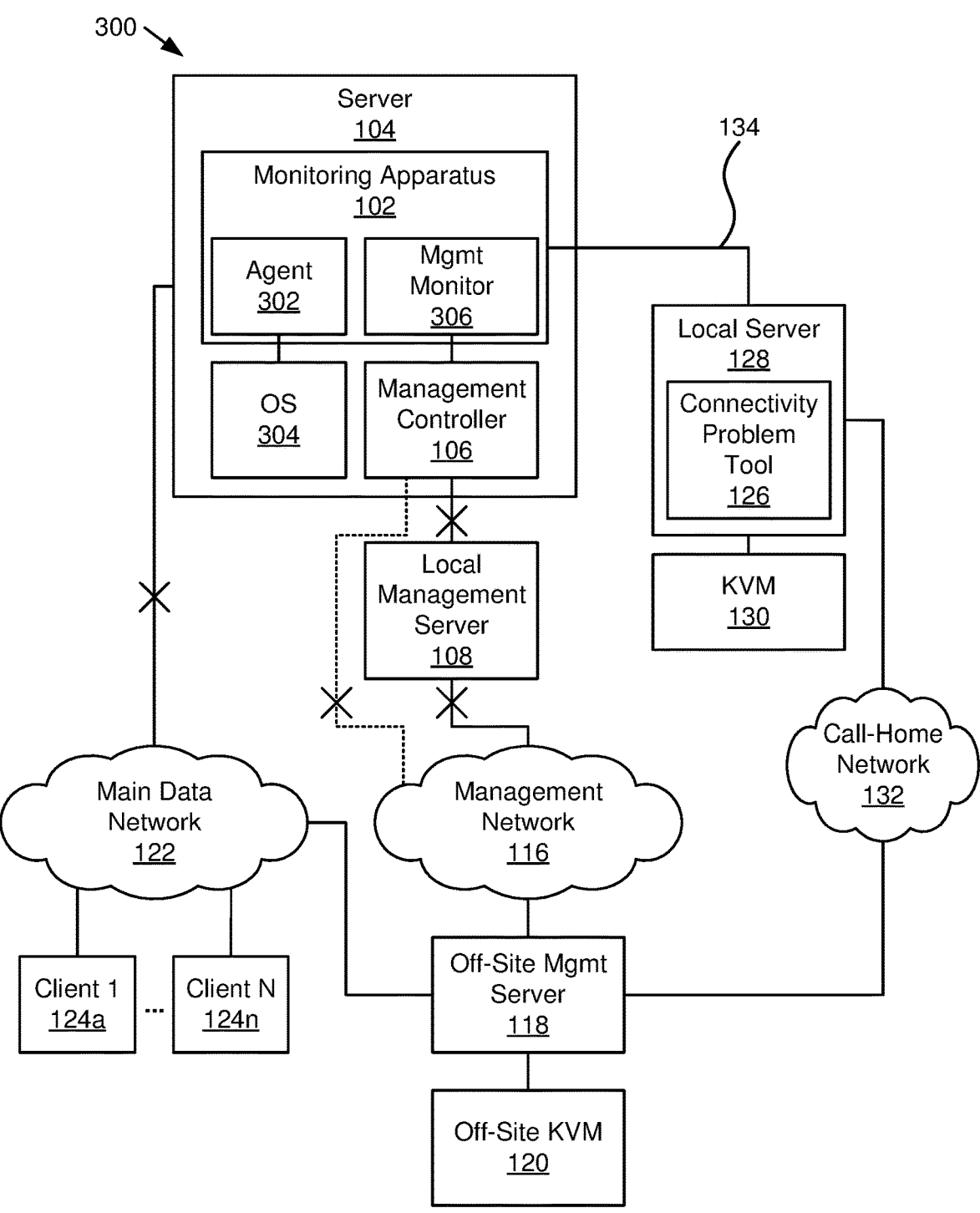
FIG. 3B is a schematic block diagram illustrating a system with a monitoring apparatus during loss of network connectivity, according to various embodiments.

FIG. 3B is a schematic block diagram illustrating the system 300 of FIG. 3A with a monitoring apparatus 102 during loss of network connectivity, according to various embodiments. FIG. 3A depicts loss of connectivity between the management controller 106 and the off-site management server 118 using "X"s. In addition, the main data network 122 is disconnected, as denoted by an "X" so the server 104 is unable to communicate with the off-site management server 118 and/or clients 124. The backup connection 134 is depicted as active, which occurs when the monitoring apparatus 102 detects a loss of communication at least between the management controller 106 and the off-site management server 118 and the monitoring apparatus 102 establishes the backup connection 134. The call-home network 132 is depicted as active, but typically would not be used where the connectivity problem tool 126 is able to remedy the connectivity issues of the management controller 106 and/or server 104.

In some embodiments, the monitoring apparatus 102 establishes the backup connection 134 when the management monitor 306 detects a loss of connectivity between the management controller 106 and the off-site management server 118. In other embodiments, the monitoring apparatus 102 establishes the backup connection 134 in response to loss of connectivity via the management network 116 an the main data network 122.

Figure 3C:
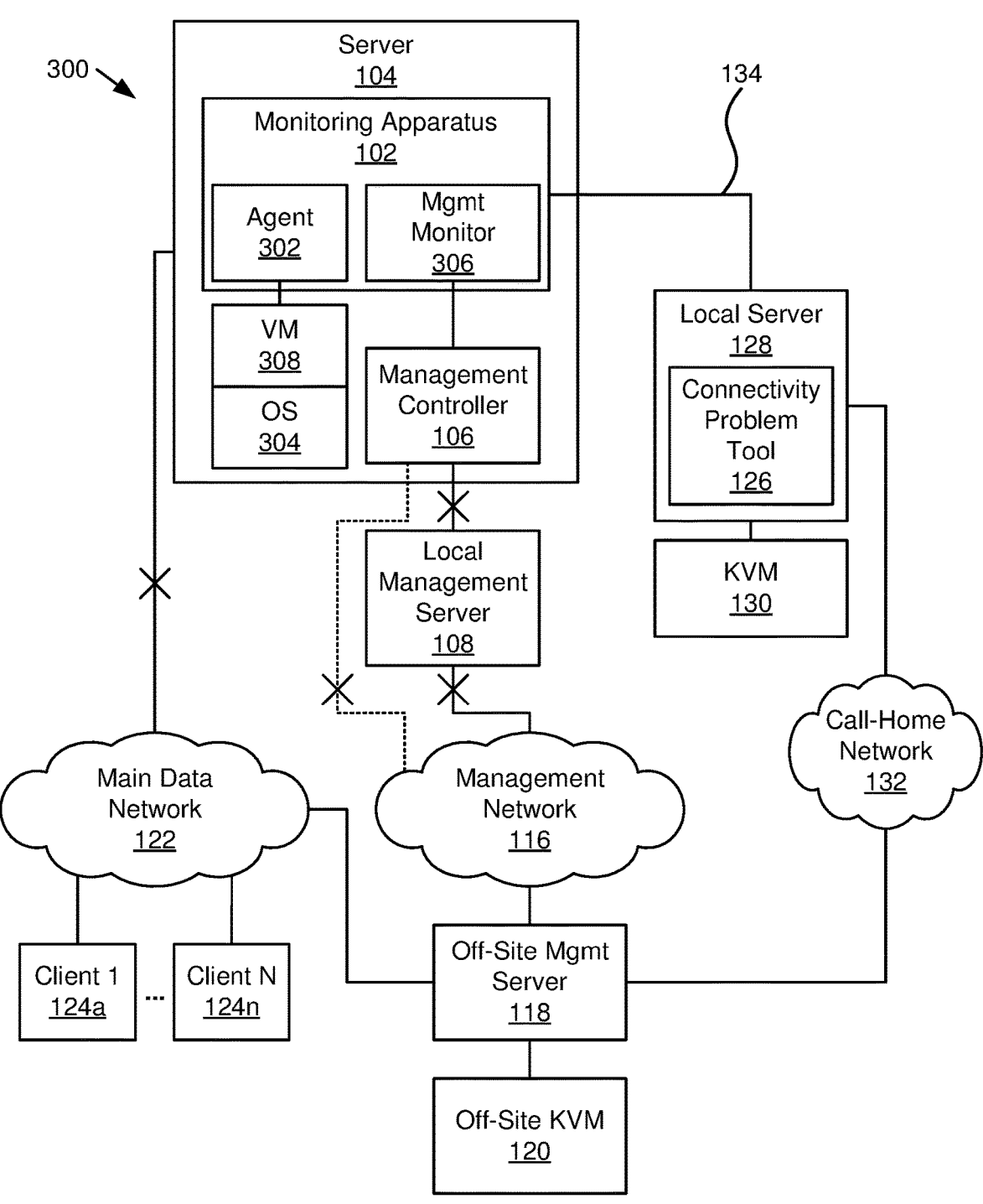
FIG. 3C is a schematic block diagram illustrating a system with a monitoring apparatus and virtual machines during loss of network connectivity, according to various embodiments.

FIG. 3C is a schematic block diagram illustrating the system 300 of FIG. 3A with a monitoring apparatus 102 and virtual machines 308 during loss of network connectivity, according to various embodiments. The system 300 of FIG. 3C is substantially similar to the system 300 of FIG. 3B but includes one or more virtual machines 308 and the agent 302 monitors connection between the virtual machines 308 and the off-site management server 118 as well as loss of communication between a hypervisor 204, server 104, etc. and the off-site management server 118.

Figure 4:
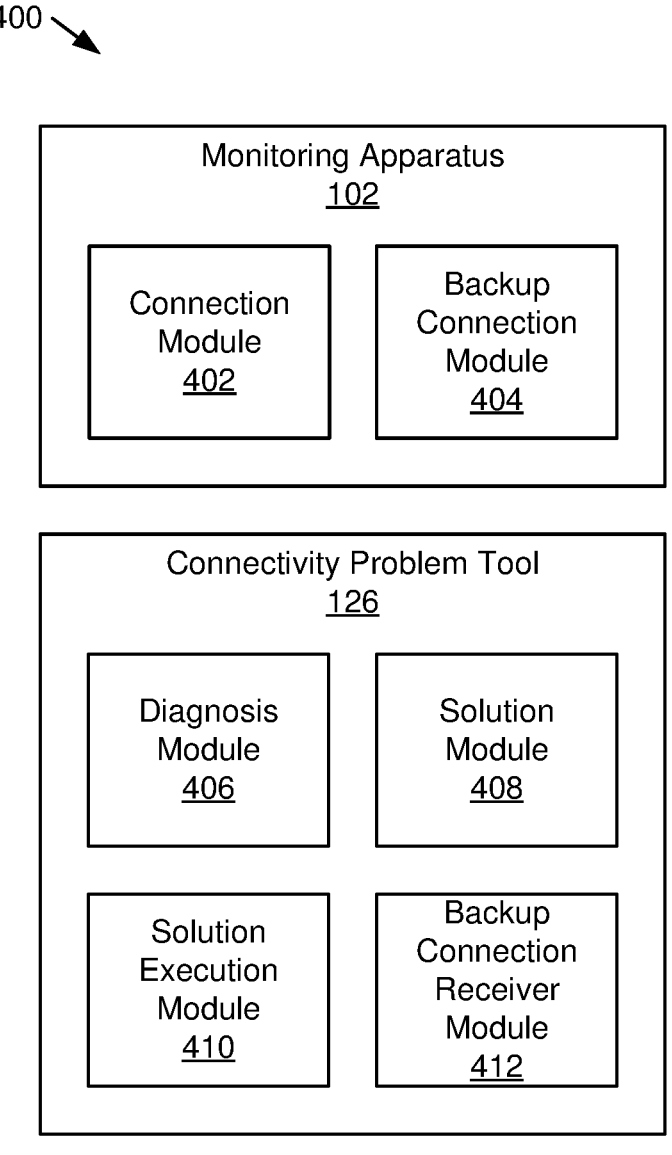
FIG. 4 is a schematic block diagram illustrating a monitoring apparatus and a connectivity problem tool, according to various embodiments.

FIG. 4 is a schematic block diagram 400 illustrating a monitoring apparatus 102 and a connectivity problem tool 126, according to various embodiments. The monitoring apparatus 102 includes a connection module 402 and a backup connection module 404 and the connectivity problem tool 126 includes a diagnosis module 406, a solution module 408, a solution execution module 410, and a backup connection receiver module 412, which are described below. In some embodiments the monitoring apparatus 102 and/or the connectivity problem tool 126 are implemented using executable code stored on computer readable storage media. In other embodiments, the monitoring apparatus 102 and/or the connectivity problem tool 126 are at least partially implemented using hardware circuits and/or a programmable hardware device. In some examples, the monitoring apparatus 102 monitors hardware functions and includes one or more hardware circuits to enable monitoring hardware functions. In other embodiments, the monitoring apparatus 102 uses existing hardware to monitor hardware functions. One of skill in the art will recognize other ways to implement the monitoring apparatus 102 and/or the connectivity problem tool 126.

The monitoring apparatus 102 includes a connection module 402 configured to determine that a computing device (e.g., server 104, storage device 105, switch 110, etc.) has lost a network connection to an off-site management server 118 where the off-site management server 118 is located at a different location than the computing device. The off-site management server 118 is any computing device that provides some management function for the computing device. In some embodiments, the connection module 402 monitors connection to a single off-site management server 118. In other embodiments, the connection module 402 monitors connection to two or more off-site management servers 118 where each off-site management server 118 provides some type of management of the computing device.

In some embodiments, the connection module 402 includes all or portions of the agent 302 and/or the management monitor 306, as described with regards to FIGS. 3A-C. In some embodiments, the management monitor 306 monitors the management controller 106 and associated hardware to determine if the management controller 106 has lost connection to the off-site management server 118. The agent 302, in some embodiments, monitors the OS of the computing device and/or hardware of the computing device to determine if the computing device has lost connection to the off-site management server 118.

The connection module 402, in various embodiments, monitors various conditions to determine loss of connectivity to the off-site management server 118. In some embodiments, the connection module 402 determines that there is a loss of connectivity by detecting data packet flow on the management network 116 and/or main data network 122. In other embodiments, the connection module 402 detects loss of connectivity due to a port unavailability, a network interface card error, etc. In other embodiments, the connection module 402 detects loss of connectivity due to the management network 116 and/or main data network 122 being unavailable.

The monitoring apparatus 102 includes a backup connection module 404 configured to establish a backup connection 134 to the local server 128. The backup connection 134 includes a wired connection, such as a USB connection, a serial connection, etc., or a short-range wireless connection, such as Bluetooth®, ZigBee®, Z-Wave®, etc. In other embodiments, the backup connection 134 is via another wireless connection type, including other wireless communication protocols available in the future. Likewise, the wired connection may include other wired connection protocols not specifically mentioned herein, including future wired protocols. The local server 128 is located on-site with the computing device. In some embodiments, the backup connection module 404 establishes the backup connection 134 in response to loss of connectivity between the management controller 106 and the off-site management server 118. In other embodiments, the backup connection module 404 establishes the backup connection 134 in response to loss of connectivity between the management controller 106 and the off-site management server 118 and between the computing device and the off-site management server 118, for example, over the main data network 122.

In some embodiments, the backup connection module 404 establishes the backup connection 134 by activating an existing physical connection to the local server 128, by activating a port, unblocking the backup connection 134, or the like. In other embodiments, the backup connection module 404 establishes the backup connection 134 by activating a short-range wireless connection or other wireless connection to the local server 108, for example, by turning on a wireless radio, by enabling a short-range wireless capability of the computing device, or the like.

The connectivity problem tool 126 includes a backup connection receiver module 412 configured to receive the backup connection 134 to the local server 128 in response to determining that the computing device has lost connection to the off-site management server 118. Receiving the backup connection 134 includes recognizing the backup connection 134, assisting in establishing the backup connection 134, or the like.

The connectivity problem tool 126 includes a diagnosis module 406 configured to diagnose a problem with connectivity between the computing device and the off-site management server 118. The connectivity problem tool 126 is located on the local server 128 and the connectivity problem tool 126 diagnoses the problem with connectivity through communications over the backup connection 134.

Having the connectivity problem tool 126 on the local server 128 is advantageous for many reasons. One reason is that the connectivity problem tool 126 may serve many computing devices of a system 100 so that code for the connectivity problem tool 126 need not be duplicated in each computing device of the system 100. In addition, the local server 128 may have access to the call-home network 132 where the computing device may not be able to communicate via the call-home network 132. In other embodiments, the backup connection 134 may be under BIOS control, UEFI control, etc. and may be able to bypass problems causing the loss of connectivity of the computing device/management controller 106. In addition, the connectivity problem tool 126 being outside of the computing device may allow the connectivity problem tool 126 to communicate with a database of connectivity problems, may more easily have updates downloaded to the centralized connectivity problem tool 126, etc.

While the connection module 402 may be able to determine that connectivity between the computing device/management controller 106 is lost, the diagnosis module 406 of the connectivity problem tool 126, in some embodiments, includes a more thorough diagnosis capability that is able to determine a cause for the loss of connectivity.

The diagnosis module 406, in various embodiments, explores various conditions to determine loss of connectivity to the off-site management server 118. In some embodiments, the diagnosis module 406 determines that a software error has resulted in the loss of connectivity. In other embodiments, the diagnosis module 406 determines that the loss of connectivity is due to a processor of the computing device/management controller 106 being too busy to send packets at a normal or reasonable rate to the off-site management server 118. The processor being too busy may be a result of a software error, software being caught in a loop, a virus, a denial of service attack, or other reason known to those of skill in the art.

In other embodiments, the diagnosis module 406 diagnoses the loss of connectivity based on a port failure, a network interface card ("NIC") failure, etc. In other embodiments, the diagnosis module 406 diagnoses loss of connectivity based on the management network 116 and/or main data network 122 being unavailable. In other embodiments, the diagnosis module 406 diagnoses a loss of connectivity due to a security compliance issue associated with connection to the off-site management server 118 preventing connectivity. In some examples, a system administrator may have blocked access to the computing device due to the security compliance issue. One of skill in the art will recognize other ways that the diagnosis module 406 of the connectivity problem tool 126 diagnoses a reason for loss of connectivity to the off-site management server 118.

The connectivity problem tool 126 includes a solution module 408 configured to identify one or more solutions directed at restoring connectivity between the computing device and the off-site management server 118. In some embodiments, the connectivity problem tool 126 selects the one or more solutions based on the diagnosis of the diagnosis module 406. In some embodiments, the connectivity problem tool 126 includes a data structure, such as a table, a database, etc., that links various solutions with particular problems and the solution module 408 accesses the data structure to identify one or more solutions based on one or more identified problems by the diagnosis module 406.

In some embodiments, a solution includes rebooting the computing device. In other embodiments, a solution is to communicate with a security certificate authority to update a security certificate of the computing device. In other embodiments, a solution is to contact a system administrator to unblock access to the computing device by demonstrating that a security certificate of the computing device is current. In other embodiments, a solution is to stop and/or restart one or more processes running on the computing device. In other embodiments, a solution is to block incoming communications from a source, such as a source that is initiating a denial of service attack. In other embodiments, a solution is to restart, reboot, refresh, etc. a hardware component of the computing device. In other embodiments, a solution is to restart a process, an application, or other software element running on the computing device. In other embodiments, a solution is to restart a network or to contact a system administrator to restart a network. In other embodiments, a solution includes two or more solutions executed in a sequence. One of skill in the art will recognize other solutions to restore connectivity between the computing device and the off-site management server 118.

In other embodiments, the solution module 408 creates one or more solutions specific to the computing device, such as renewing a digital certificate for the computing device, interrupting a process that is slowing down a processor of the computing device, or the like. Diagnosing connectivity problems and identifying solutions is discussed in more detail below with respect to an artificial intelligence ("AI") engine 502 of the connectivity problem tool 126.

The connectivity problem tool 126 includes a solution execution module 410 configured to execute the one or more solutions identified by the solution module 408. In some embodiments, the solution execution module 410 executes one or more of the identified solutions from the local server 128. In other embodiments, the solution execution module 410 directs the computing device to execute one or more of the identified solutions. In other embodiments, the solution execution module 410 executes a solution or directs execution of a solution external to the computing device, such as restarting a network (e.g., the management network 116 and/or the main data network 122). In some embodiments, the solution execution module 410 determines a result of execution of each of the solutions, for example by directing the connection module 402 to reassess connectivity between the computing device and the off-site management server 118. One of skill in the art will recognize other ways for the solution execution module 410 to execute one or more identified solutions to attempt to restore connectivity between the computing device and the off-site management server 118.

A purpose of the monitoring apparatus 102 and the connectivity problem tool 126 is to detect loss of connectivity and to attempt to restore connectivity to the off-site management server 118 without human intervention. The monitoring apparatus 102 and/or the connectivity problem tool 126 act automatically and attempt to restore connectivity between a computing device and the off-site management server 118 and seek system administrator help only when the monitoring apparatus 102 and the connectivity problem tool 126 are unable to re-establish connectivity.

Figure 5:
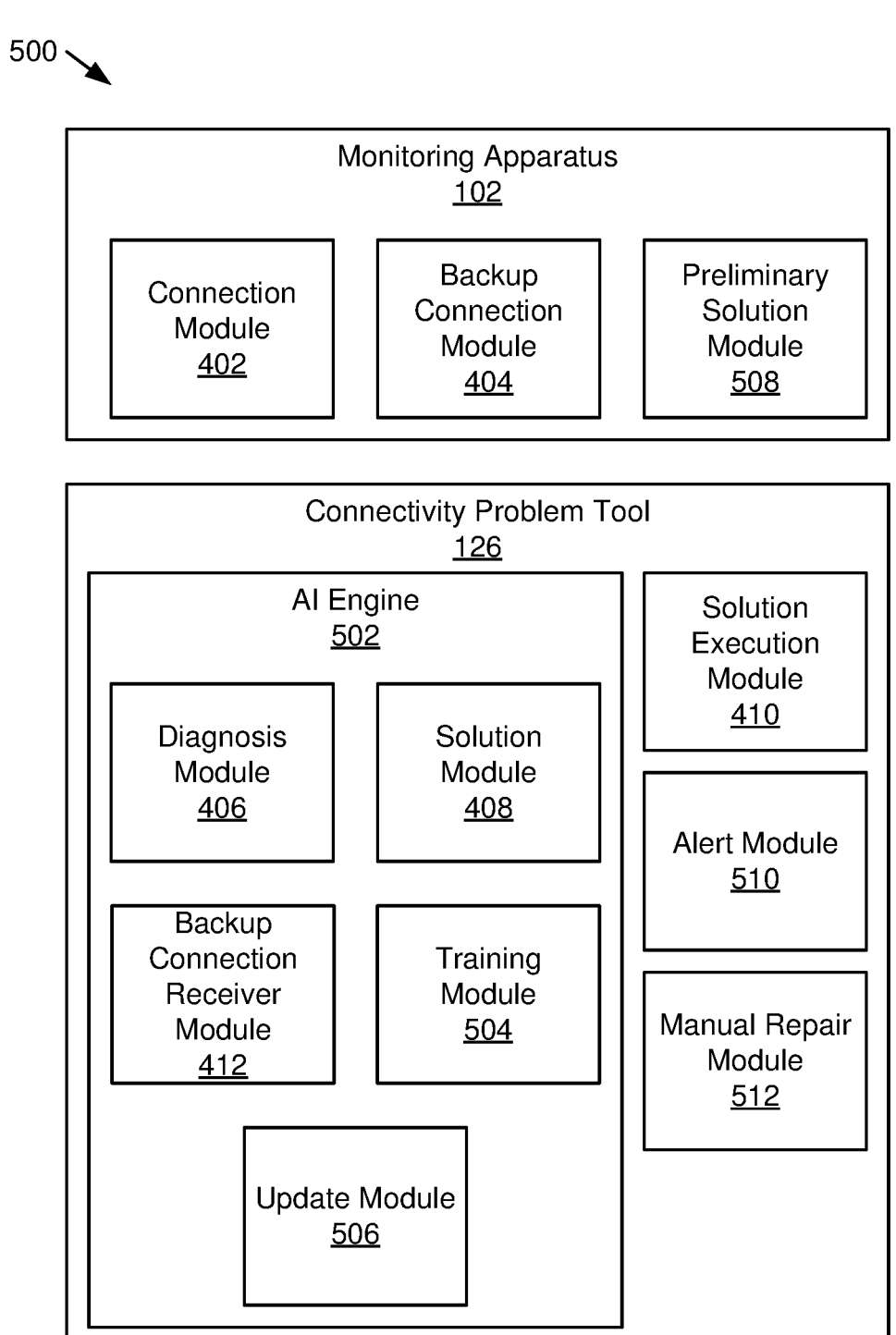
FIG. 5 is a schematic block diagram illustrating another monitoring apparatus and another connectivity problem tool, according to various embodiments.

FIG. 5 is a schematic block diagram 500 illustrating another monitoring apparatus 102 and another connectivity problem tool 126, according to various embodiments. In the embodiments of FIG. 5, the connectivity problem tool 126 includes an AI engine 502 that includes the diagnosis module 406, the solution module 408, the backup connection receiver module 412, a training module 504, and/or an update module 506, the connectivity problem tool 126 includes an alert module 510 and a manual repair module 512, and the monitoring apparatus 102 includes a preliminary solution module 508, which are described below. The monitoring apparatus 102 and the connectivity problem tool 126 of FIG. 5 are implemented similar to the monitoring apparatus 102 and the connectivity problem tool 126 of FIG. 4.

The connectivity problem tool 126, in some embodiments, includes an AI engine 502 configured to use a machine learning algorithm to diagnose the problem with connectivity between the computing device and the off-site management server 118 and to identify the one or more solutions. In some embodiments, the diagnosis module 406 is part of the AI engine 502 and diagnoses the problem with connectivity between the computing device and the off-site management server 118. In other embodiments, the solution module 408 is part of the AI engine 502 and identifies the one or more solutions.

In some embodiments, the AI engine 502 uses classical machine learning and labeled datasets during supervised learning to inform the machine learning algorithms of the connectivity problem tool 126. Input to the machine learning algorithms include diagnosed problems with connectivity between the computing device and the off-site management server 118, identified solutions directed at restoring connectivity, and results of the identified solutions. The input to the machine learning algorithms, in some embodiments, is from the computing device. In other embodiments, the input to the machine learning algorithms is from other computing devices of the system 100 and/or other computing devices of other systems. The other systems, in some embodiments, are known to and/or connected to the off-site management server 118.

In other embodiments, the AI engine 502 uses artificial neural networks ("ANNs") and/or deep learning to use datasets that are not labeled to automatically determine a set of features which distinguish different categories of data from one another and eliminates some human intervention. In some embodiments, at least some of the datasets are the input to the machine learning algorithms. The ANNs, in some embodiments, include node layers with an input layer, one or more hidden layers, and an output layer. In some embodiments, the input layer of the ANN of the AI engine 502 includes input from the diagnosis module 406, the solution module 408, and/or results of the solutions, which may be tracked by the solution execution module 410 or other device. The hidden layers, in some embodiments, are part of the AI engine 502 and the output layer is part of the solution module 408. In some embodiments, the hidden layers are deep learning and are two or more layers deep.

In some embodiments, the AI engine 502 includes a training module 504 configured so that the machine learning algorithm of the AI engine 502 uses data from a plurality of computing devices. The data is gathered during a training phase and the data includes conditions related to connectivity between the computing devices and a corresponding off-site management server connected over a network and/or one or more solutions used to resolve the connectivity between the plurality of computing devices and the corresponding off-site management server.

In some embodiments, the machine learning algorithm of the training module 504 of the AI engine 502 uses data from a plurality of computing devices and the data is gathered during the training phase where the data includes conditions related to connectivity between the computing devices and a corresponding management server(s) connected over a network, which may include the off-site management server 118, and/or one or more solutions used to resolve the connectivity between the plurality of computing devices and the corresponding management server(s).

In some embodiments, during the training phase, the training module 504 of the connectivity problem tool 126 gathers information about diagnosed connectivity problems and/or connectivity problems entered by a user along with solutions tried by a system administrator or other use and results of the solutions to train one or more machine learning algorithms of the AI engine 502 and during the training phase the connectivity problem tool 126 does not identify solutions. In other embodiments, during the training phase the training module 504 of the connectivity problem tool 126 identifies solutions, but the solutions are not implemented and are instead used to compare to successful solutions tried by a system administrator. In other embodiments, the AI engine 502 is preloaded with information regarding successful solutions to diagnosed connectivity problems so that preloading the AI engine 502 constitutes the training phase for the computing device.

In some embodiments, a portion of the connectivity problem tool 126 is located on the computing device. In other embodiments, the monitoring apparatus 102 includes an application programming interface ("API") that enables the connectivity problem tool 126 to access the computing device and to execute one or more solutions. In some embodiments, a portion of the AI engine 502 is located on the computing device.

In some embodiments, the AI engine 502 includes an update module 506 that directs one or more machine learning algorithms of the AI engine 502 to use data from diagnosing the problem with the connectivity between the computing device and the off-site management server 118 and/or results from executing the one or more solutions in an operational phase to revise the one or more machine learning algorithms. Thus, the update module 506 uses results of solutions executed on the computing device or other computing devices and correlations between diagnosed problems and successful or unsuccessful solutions to improve the one or more machine learning algorithms of the AI engine 502. In other embodiments, information about successful or unsuccessful restoration of connectivity includes relevant information, such as configuration information about the computing device, management controller 106, network information, and the like.

While the AI engine 502 is depicted in the connectivity problem tool 126, which could reside on the local server 128, in some embodiments, a portion of the AI engine 502 and/or a machine learning algorithm is included in the monitoring apparatus 102 and includes the connection module 402. In the embodiments, the machine learning algorithm of the portion of the AI engine 502 in the monitoring apparatus 102 provides improvement in determining that the computing device has lost connectivity to the off-site management server 118 over the management network 116 and/or the main data network 122. In some examples, output of the machine learning algorithm of the portion of the AI engine 502 in the monitoring apparatus 102 is used to refine identification of conditions causing or contributing to loss of connection between the computing device and the off-site management server 118.

In some embodiments, the monitoring apparatus 102 includes a preliminary solution module 508 configured to execute, on the computing device, a preliminary solution to restore loss of connectivity between the computing device and the off-site management server 118 prior to establishing the backup connection 134. Establishing the backup connection 134 is then in response to a failure of the execution of the preliminary solution. In some examples, the preliminary solution may include rebooting the computing device, stopping and restarting a process, or other solution that may be performed by the computing device without external intervention from the connectivity problem tool 126. In some embodiments, the preliminary solution module 508 has a limited set of solutions based on a limited set of determined reasons for loss of connectivity while the connectivity problem tool 126 includes a more powerful diagnostic capability and additional solutions.

In some situations, solutions executed by the solution execution module 410 do not result in restoration of connectivity between the computing device and the off-site management server 118. In some examples, loss of connectivity may be a result of a hardware failure that is remedied by a user replacing the hardware. In some embodiments, the connectivity problem tool 126 includes an alert module 510 configured to, in response to a failure of the one or more solutions restoring connectivity between the computing device and the off-site management server 118, transmit an alert to a system administrator over a secondary connection. In some embodiments, the alert informs the system administrator of the loss of connectivity between the computing device and the off-site management server 118 and/or failure of one or more solutions to restore the connectivity.

In some examples, the secondary connection is the call-home network 132. In other embodiments, the secondary connection is an on-site network that may be wired or wireless that is connected to an on-site server of a system administrator or other user that is able to fulfill a role as a system administrator in responding to the alert. In other embodiments, the secondary network is secondary to the management network 116 and may include use of the main data network 122.

The alert may take many forms. In some embodiments, the alert sent by the alert module 510 is a direct message ("DM") sent to a computing device of the system administrator. The computing device of the system administrator may include a desktop computer, a laptop computer, a tablet computer, a smartphone, or the like. In other embodiments, the alert is in the form of a text message. In other embodiments, the alert is in the form of an email. In some embodiments, the alert is sent in two or more formats simultaneously. In other embodiments, the alert module 510 sends an alert in one form and then later sends an alert in a different form. In other embodiments, the alert module 510 send the alert to two or more computing devices of the system administrator. One of skill in the art will recognize other forms for the alert and other secondary connections to a system administrator.

In some embodiments, the connectivity problem tool 126 includes a manual repair module 512 configured to, in response to the transmission of the alert, receive input from a system administrator to manually restore the connectivity between the computing device and the off-site management server 118 where a manual repair command in response to the input is received over the backup connection 134. In some embodiments, the connectivity problem tool 126 includes an interface with one or more commands, diagnostic information, and the like to provide assistance and information regarding the loss of connectivity to the system administrator. In some embodiments, the manual repair module 512 provides information about one or more diagnoses from the diagnosis module 406, one or more executed solutions, and other related information to the system administrator to assist in repairing the loss of connectivity. One of skill in the art will recognize other information and resources that may be provided by the manual repair module 512.

Figure 6:
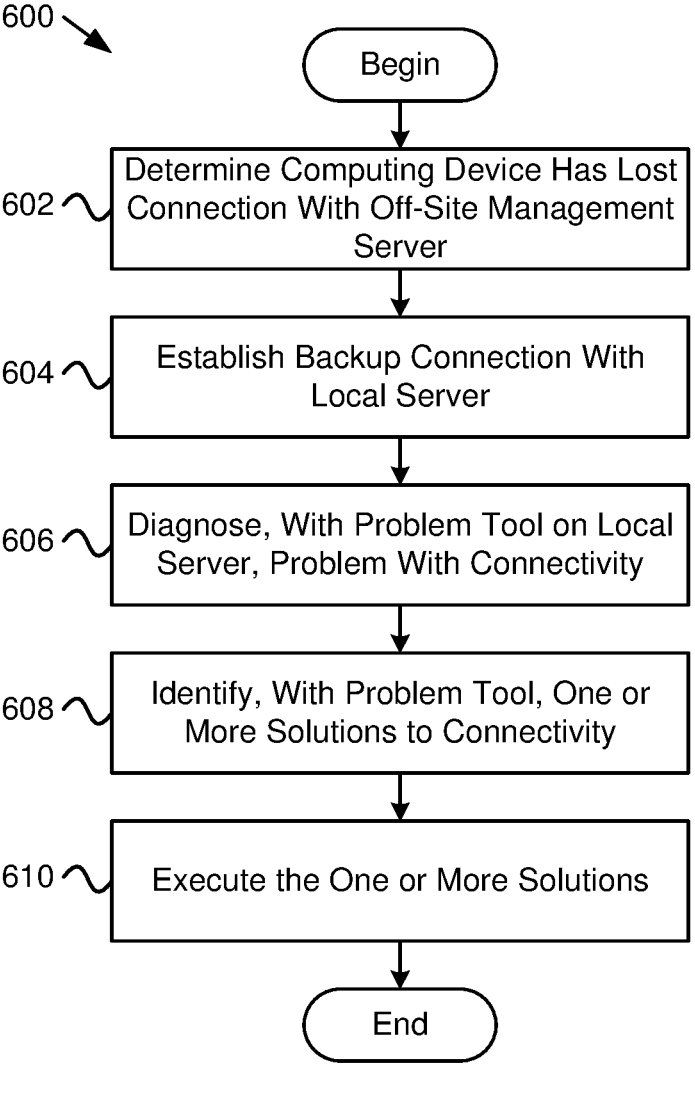
FIG. 6 is a schematic flow chart diagram illustrating a method for providing a backup connection to a computing device for remediation after detecting network connection loss, according to various embodiments.

FIG. 6 is a schematic flow chart diagram illustrating a method 600 for providing a backup connection 134 to a computing device for remediation after detecting network connection loss, according to various embodiments. The method 600 begins and determines 602 that a computing device has lost a network connection to an off-site management server 118. The off-site management server 118 is located at a different location than the computing device. The method 600 establishes 604 a backup connection 134 to a local server 128 in response to determining that the computing device has lost connection to the off-site management server 118. The backup connection 134 is a wired connection or a wireless connection and the local server 128 located on-site with the computing device.

The method 600 diagnoses 606, using a connectivity problem tool 126 executing at least partially on the local server 128, a problem with connectivity between the computing device and the off-site management server 118 and identifies 608, using the connectivity problem tool 126, one or more solutions directed at restoring connectivity between the computing device and the off-site management server 118. The method 600 executes 610 the one or more solutions, and the method 600 ends. In various embodiments, all or a portion of the method 600 is implemented using the connection module 402, the backup connection module 404, the diagnosis module 406, the solution module 408, and/or the solution execution module 410.

Figure 7:
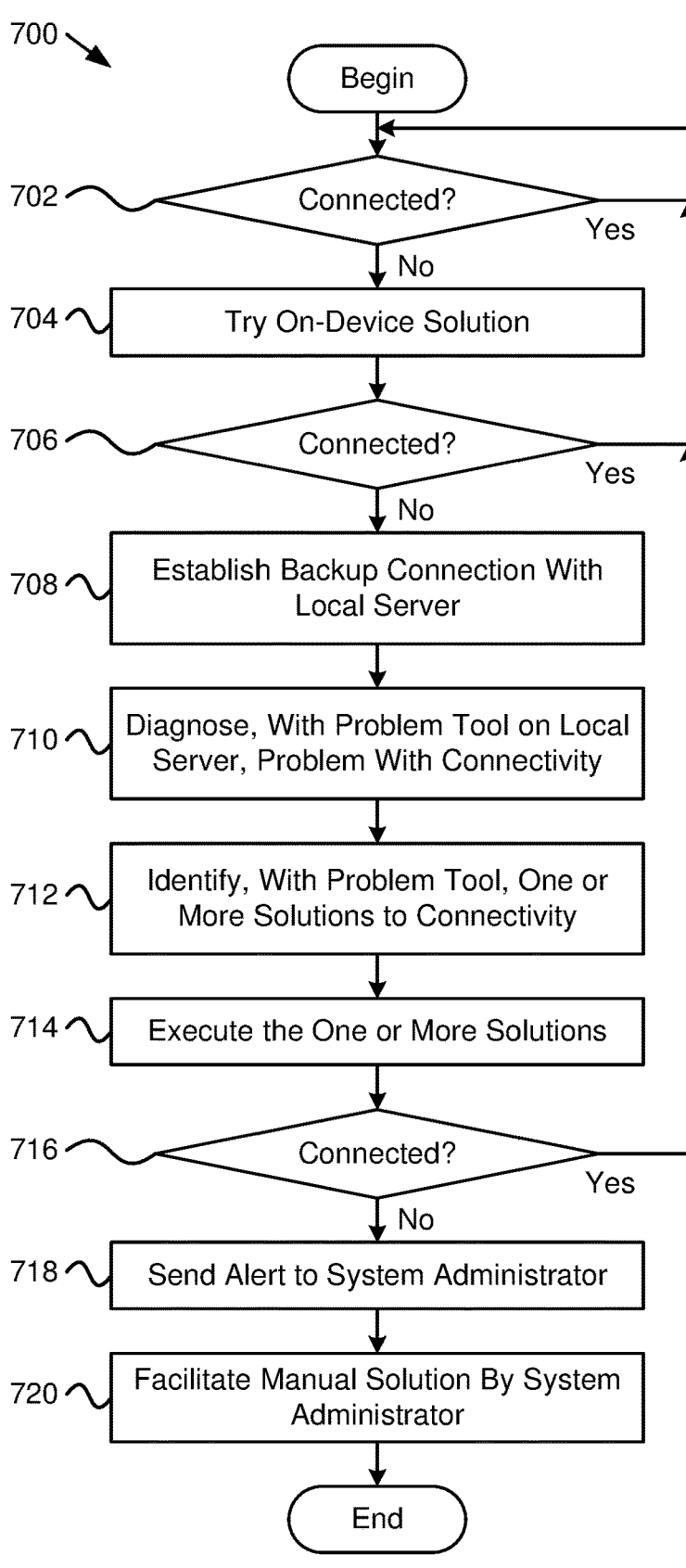
FIG. 7 is a schematic flow chart diagram illustrating another method for providing a backup connection to a computing device for remediation after detecting network connection loss, according to various embodiments.

FIG. 7 is a schematic flow chart diagram illustrating another method 700 for providing a backup connection 134 to a computing device for remediation after detecting network connection loss, according to various embodiments. The method 700 begins and determines 702 if the computing device is connected to the off-site management server 118. If the method 700 determines 702 that the computing device is connected to the off-site management server 118, the method 700 returns and continues to determine 702 if the computing device is connected to the off-site management server 118. If the method 700 determines 702 that the computing device is not connected to the off-site management server 118, the method 700 attempts 704 a preliminary solution to restore connectivity between the computing device and the off-site management server 118.

The method 700 again determines 706 if the if the computing device is connected to the off-site management server 118. If the method 700 determines 706 that the computing device is connected to the off-site management server 118, the method 700 returns and continues to determine 702 if the computing device is connected to the off-site management server 118. If the method 700 determines 706 that the computing device is not connected to the off-site management server 118 after execution of the preliminary solution, the method 700 establishes 708 a backup connection 134 to a local server 128. The backup connection 134 is a wired connection or a wireless connection and the local server 128 located on-site with the computing device.

The method 700 diagnoses 710, using a connectivity problem tool 126 executing at least partially on the local server 128, a problem with connectivity between the computing device and the off-site management server 118 and identifies 712, using the connectivity problem tool, one or more solutions directed at restoring connectivity between the computing device and the off-site management server 118. The method 700 executes 714 the one or more solutions and determines 716 if the if the computing device is connected to the off-site management server 118. If the method 700 determines 716 that the computing device is connected to the off-site management server 118, the method 700 returns and continues to determine 702 if the computing device is connected to the off-site management server 118.

If the method 700 determines 716 that the computing device is not connected to the off-site management server 118, the method 700 sends 718 an alert to a system administrator and facilitates 720 a manual solution by the system administrator, and the method 700 ends. In various embodiments, all or a portion of the method 700 is implemented using the connection module 402, the backup connection module 404, the diagnosis module 406, the solution module 408, the solution execution module 410, the AI engine 502, the training module 504, the update module 506, the preliminary solution module 508, the alert module 510, and/or the manual repair module 512.

Figure 8:
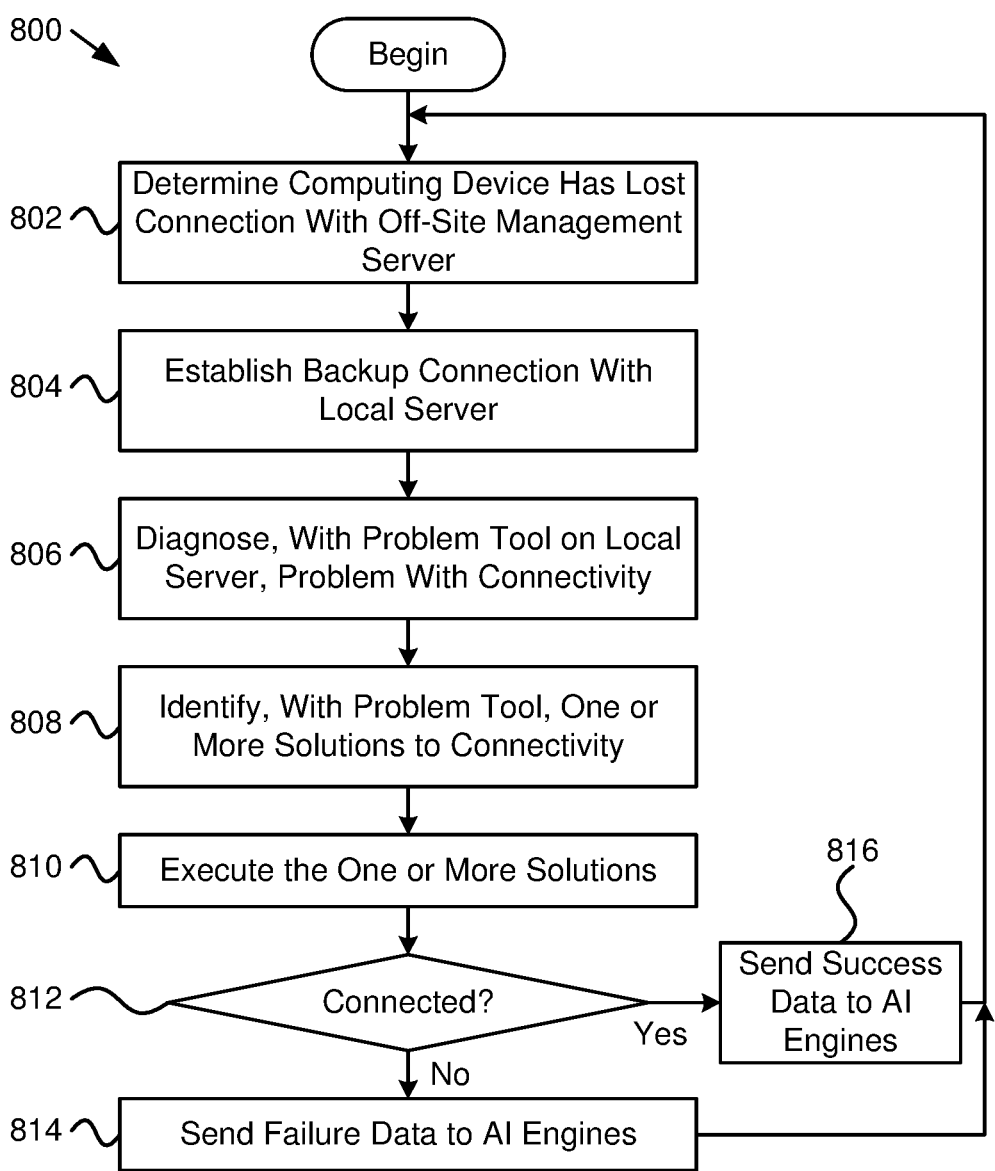
FIG. 8 is a schematic flow chart diagram illustrating a method for machine learning to train an artificial intelligence engine for restoring connectivity, according to various embodiments.

FIG. 8 is a schematic flow chart diagram illustrating a method 800 for machine learning to train an artificial intelligence engine for restoring connectivity, according to various embodiments. The method 800 begins and determines 802 that a computing device has lost connectivity with an off-site management server, such as the off-site management server 118 of the system 100 of FIG. 1. In various embodiments, the method 800 determines 802 that a computing device has lost connectivity with an off-site management server in various systems and/or for various computing devices.

The method 800 establishes 804 a backup connection, such as the backup connection 134 of the system 100 of FIG. 1, with a local server, such as the local server 128 of the system 100 of FIG. 1. The method 800 diagnoses 806, with a connectivity problem tool, such as the connectivity problem tool 126 of the system 100 of FIG. 1, and identifies 808, with the connectivity problem tool, one or more solutions to the loss of connectivity between the computing device and the corresponding off-site management server, and then executes 810 the one or more solutions. The method 800 determines 812 if connectivity between the computing device and corresponding off-site management server.

If the method 800 determines 812 that connectivity has not been restored, the method 800 sends 814 failure data to one or more AI engines, such as the AI engine 502 of FIG. 5, and the method 800 returns and continues to determine 802 if the computing device has lost connectivity with a corresponding off-site management server. If the method 800 determines 812 that connectivity between the computing device and the off-site management server has been restored, the method 800 sends 816 success data to the AI engines, and the method 800 returns and continues to determine 802 if the computing device has lost connectivity with a corresponding off-site management server. In some embodiments, the success and/or failure data includes relevant information, such as a diagnosis of what caused the loss of connectivity, identified solutions, and other relevant data. In some embodiments, the method 800 is also used in an operational phase to improve a machine learning algorithm of the AI engine 502. In various embodiments, all or a portion of the method 700 is implemented using the connection module 402, the backup connection module 404, the diagnosis module 406, the solution module 408, the solution execution module 410, the AI engine 502, the training module 504, the update module 506, the preliminary solution module 508, the alert module 510, and/or the manual repair module 512.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:

determining that a computing device has lost a network connection to an off-site management server, the off-site management server located at a different location than the computing device;

establishing a backup connection to a local server in response to determining that the computing device has lost connection to the off-site management server, the backup connection comprising one of a wired connection and a wireless connection, the local server located on-site with the computing device;

diagnosing, using a connectivity problem tool executing at least partially on the local server, a cause of a problem with connectivity between the computing device and the off-site management server;

identifying, in response to the diagnosis of the cause of the problem with the connectivity and using the connectivity problem tool, one or more solutions directed at restoring connectivity between the computing device and the off-site management server; and executing the one or more solutions.

2. The method of claim 1, wherein the connectivity problem tool uses a machine learning algorithm to diagnose the problem with connectivity between the computing device and the off-site management server and to identify the one or more solutions.

3. The method of claim 2, wherein the machine learning algorithm uses data from a plurality of computing devices, the data gathered during a training phase, the data comprising conditions related to connectivity between the computing devices and a corresponding off-site management server connected over a network and/or one or more solutions used to resolve the connectivity between the plurality of computing devices and the corresponding off-site management server.

4. The method of claim 2, wherein the machine learning algorithm uses data from diagnosing the problem with the connectivity between the computing device and the off-site management server and/or results from executing the one or more solutions in an operational phase to revise the machine learning algorithm.

5. The method of claim 1, wherein, in response to a failure of the one or more solutions restoring connectivity between the computing device and the off-site management server, further comprising transmitting an alert to a system administrator over a secondary connection.

6. The method of claim 5, further comprising, in response to the transmission of the alert, receiving input from a system administrator to manually restore the connectivity between the computing device and the off-site management server, wherein a manual repair command in response to the input is received over the backup connection.

7. The method of claim 5, wherein the secondary connection comprises a network different from the network connection between the computing device and the off-site management server.

8. The method of claim 1, further comprising execution, by the computing device, of a preliminary solution to restore loss of connectivity between the computing device and the off-site management server prior to establishing the backup connection, wherein establishing the backup connection is in response to a failure of the execution of the preliminary solution.

9. The method of claim 1, wherein the network connection between the computing device and the off-site management server is between a management controller within the computing device and the off-site management server and/or is over a management network separate from a data network used by the computing device to send and receive data from a client.

10. The method of claim 1, wherein determining that the computing device has lost the network connection to the off-site management server comprises determining that the computing device has lost a network connection between a management controller within the computing device and the off-site management server over a management network and has lost a connection between the computing device and a client over a data network.

11. The method of claim 1, wherein diagnosing the problem with the connectivity between the computing device and the off-site management server comprises at least two of a group consisting of:

determining that the computing device is not security compliant;

determining that computing resources of the computing device are used for excessive out-of-band network communications;

determining that the computing device is under attack by a computer virus;

determining that the network connection is not operational; and determining that a hardware device in the computing device is not functioning properly.

12. An apparatus comprising:

a connectivity problem tool executing at least partially on a local server comprising:

a backup connection receiver module configured to receive a backup connection to a local server in response to determining that a computing device has lost connection to an off-site management server, the backup connection comprising one of a wired connection and a wireless connection, the off-site management server located at a different location than the computing device, the local server located on-site with the computing device;

a diagnosis module configured to diagnose a cause of a problem with connectivity between the computing device and the off-site management server; and a solution module configured to identify, in response to the diagnosis of the cause of the problem with the connectivity, one or more solutions directed at restoring connectivity between the computing device and the off-site management server; and a solution execution module configured to execute the one or more solutions, wherein said modules comprise hardware circuits, a programmable hardware device, and/or executable code, the executable code stored on computer readable storage media.

13. The apparatus of claim 12, wherein the connectivity problem tool uses a machine learning algorithm to diagnose the problem with connectivity between the computing device and the off-site management server and to identify the one or more solutions.

14. The apparatus of claim 13, wherein the machine learning algorithm uses data from a plurality of computing devices, the data gathered during a training phase, the data comprising conditions related to connectivity between the computing devices and a corresponding off-site management server connected over a network and/or one or more solutions used to resolve the connectivity between the plurality of computing devices and the corresponding off-site management server.

15. The apparatus of claim 13, wherein the machine learning algorithm uses data from diagnosing the problem with the connectivity between the computing device and the off-site management server and/or results from executing the one or more solutions in an operational phase to revise the machine learning algorithm.

16. The apparatus of claim 12, wherein the computing device comprises a monitoring apparatus comprising:

a connection module configured to determine that the computing device has lost the network connection to the off-site management server;

a backup connection module configured to establishing the backup connection to the local server in response to determining that the computing device has lost connection to the off-site management server; and/or a preliminary solution module configured to execute, on the computing device, a preliminary solution to restore loss of connectivity between the computing device and the off-site management server prior to establishing the backup connection, wherein establishing the backup connection is in response to a failure of the execution of the preliminary solution.

17. The apparatus of claim 12, further comprising:

an alert module configured to, in response to a failure of the one or more solutions restoring connectivity between the computing device and the off-site management server, transmit an alert to a system administrator over a secondary connection; and/or a manual repair module configured to, in response to the transmission of the alert, receive input from a system administrator to manually restore the connectivity between the computing device and the off-site management server, wherein a manual repair command in response to the input is received over the backup connection.

18. The apparatus of claim 12, wherein the network connection between the computing device and the off-site management server is between a management controller within the computing device and the off-site management server and/or is over a management network separate from a data network used by the computing device to send and receive data from a client.

19. A program product comprising a non-transitory computer readable storage medium storing code, the code being configured to be executable by a processor to perform operations comprising:

receiving, using a connectivity problem tool, a backup connection to a local server in response to determining that a computing device has lost connection to an off-site management server, the backup connection comprising one of a wired connection and a wireless connection, the off-site management server located at a different location than the computing device, the local server located on-site with the computing device;

diagnosing, using the connectivity problem tool executing at least partially on the local server, a cause of a problem with connectivity between the computing device and the off-site management server;

identifying, in response to the diagnosis of the cause of the problem with the connectivity using the connectivity problem tool, one or more solutions directed at restoring connectivity between the computing device and the off-site management server; and executing the one or more solutions.

20. The program product of claim 19, wherein the connectivity problem tool uses a machine learning algorithm to diagnose the problem with connectivity between the computing device and the off-site management server and to identify the one or more solutions and wherein the machine learning algorithm uses data from a plurality of computing devices, the data gathered during a training phase, the data comprising conditions related to connectivity between the computing devices and a corresponding off-site management server connected over a network and/or one or more solutions used to resolve the connectivity between the plurality of computing devices and the corresponding off-site management server.

\* \* \* \* \*